United States Patent
Fairbairn

(10) Patent No.: US 7,113,449 B2
(45) Date of Patent: Sep. 26, 2006

(54) MARINE ELECTRONICS WITH LURE DEPTH ANALYZER

(76) Inventor: Scott R. Fairbairn, W. 7811 - 135th Ave., Hager City, MN (US) 54014

( * ) Notice: Subject to any disclaimer, the term of this patent is extended or adjusted under 35 U.S.C. 154(b) by 88 days.

(21) Appl. No.: 11/017,034

(22) Filed: Dec. 20, 2004

(65) Prior Publication Data

US 2005/0135192 A1   Jun. 23, 2005

Related U.S. Application Data

(60) Provisional application No. 60/530,715, filed on Dec. 18, 2003.

(51) Int. Cl.
*G01S 15/96*   (2006.01)

(52) U.S. Cl. ..................................... 367/111
(58) Field of Classification Search ............... 367/111
See application file for complete search history.

(56) References Cited

U.S. PATENT DOCUMENTS

| 3,786,586 | A | 1/1974 | Swan |
| 4,445,178 | A | 4/1984 | Scheer et al. |
| 6,628,569 | B1 | 9/2003 | Steiner et al. |
| 6,819,629 | B1 | 11/2004 | Cummings et al. |
| 6,980,484 | B1 * | 12/2005 | Chen ........................... 367/99 |
| 2004/0051681 | A1 | 3/2004 | Kitayama |
| 2004/0104863 | A1 | 6/2004 | Hitomi et al. |
| 2005/0135192 | A1 * | 6/2005 | Fairbairn .................... 367/111 |

* cited by examiner

*Primary Examiner*—Dan Pihulic
(74) *Attorney, Agent, or Firm*—Kinney & Lange, P.A.

(57) ABSTRACT

A lure depth analyzer includes a digital processor, a lure analyzer data structure, a user interface having a display and user inputs to input and display variables relating to fishing lures. The database relates specific lures to running depth, length of line, and other variables such as line type, speed, and addition weights added to the line. The angler is interactively led through the user interface to provide known information and angler selections. The display returns information necessary for the angler to cast or troll a lure at a particular depth.

20 Claims, 1 Drawing Sheet ved the first boat (containing the rod and reel with a fishing lure) towing the second boat with someone operating the sonar unit. The person in the first boat would let out 120 feet of fishing line and allow the lure to achieve its natural running depth, while the sonar operator in the second boat recorded actual running depths of the lure in question based on the sonar reading. The information collected was then compiled on a circular wheel-like laminated paper disc with lure types serving as the spokes of the wheel and a running depth at the ends of the spokes. This was the first commercially produced system available for anglers that gave pertinent information about running depths of lures based on a particular line out length.

MARINE ELECTRONICS WITH LURE DEPTH ANALYZER

This application claims priority from Provisional Application No. 60/530,715 filed Dec. 18, 2003, for "Marine Electronics With Lure Depth Analyzer".

BACKGROUND OF THE INVENTION

The invention relates to improved equipment and methods for aiding anglers in selecting lures and lengths of line to position lures at a particular depth in the water column.

Over time anglers have used a variety of methods to determine how much line would be needed to be let out while trolling or casting in order for a lure to reach a particular running depth. In the past, the only method available to anglers to know how deep a lure was running was instinct. Angle marked fishing line at increments of length and let lures out until they felt the lures hitting bottom. In this case, there were a number of variables (e.g. line diameter, trolling speed) that caused inaccuracies.

In the mid 1980's, line counter reels were developed by fishing reel manufacturers that fairly accurately and repeatedly allowed anglers to let out the same amount of line time after time. The invention of line counter reels allowed the average angler to easily know how much line had been let out. Around the same time period, many anglers began trolling arid casting for fish that were not bottom oriented. Anglers found that placing lures at a particular depth somewhere in the water column required, at minimum, a knowledge of an amount of line out and the running depth of a particular lure at that amount of line out. This knowledge was more difficult to ascertain than simply letting line out until a lure bounced bottom. Some anglers set about recording information regarding amount of line out and a related depth for a particular lure. This information was manually collected by running lures into the bottom and recording the variables involved, specifically line out.

By the early 1990's, the need for accurate data on lure running depths became apparent. Professional angler Mike McClelland, from Pierre, S. Dak., measured lure running depths by a method of tying two boats together with a 120 foot rope. The first boat held one person with a fishing rod and linecounter reel and various lures. The second boat was equipped with a sonar unit. The method of measurement invol The product available from McClelland did not include information beyond a running depth at one length of line, only covered a small portion of commercially produced lure types, and lacked information about running depth based on other variables (e.g. speed).

In the mid 1990's another commercial product, Precision Trolling, was produced with more lure types and in the format of a book. This book contained data presented one lure per page. Each page contained a diagram containing an X axis and Y axis and a corresponding "dive curve" algorithm for the lure on the page. The data had been collected by trolling lures past a pole placed in the water and marked at various depths. A diver recorded depths relative to different amounts of line out. This level of data was an improvement on the prior product from McClelland. The Precision Trolling book also contained written information addressing other variables associated with lure running depths, including line diameter, weights systems and speed. Over the next ten years, as new lures were developed and manufactured, the Precision Trolling book went through several updates to include information on these new lures. Currently the book is in its 7$^{th}$ edition.

In 2002, the makers of precision Trolling created similar data for lures based on casting of lures as opposed to trolling. The data is presented in a similar book format including algorithms displayed for a particular lure on each page.

Over time various methods for determining lure depth based on line length and other variables have been developed ranging from instinct, casual recording, and commercially produced products that have displayed print data as either one lure with one line length and corresponding depth (McClelland) or as an algorithm on a graph displaying line out on one axis and running depth on the other.

All of the methods used to date have been either incomplete in the variables accounted for or cumbersome for the angler to use. As an example, when using the current best and most accurate method of determining lure depths (Precision Trolling), the angler must first retrieve the book from some waterproof compartment in the boat. The book is something the angler is not currently using in the angling process. Second, the angler must know which lure to look for in the book and flip through the book until the lure is found. Finally, the angler is required to read and interpret the algorithm to determine how much line should be let out for the lure to achieve the desired depth. In addition, while data is available in diagram form regarding the effect of other variables (speed, line diameters, weight systems) the angler is required to take yet another step to determine lure depth based on the variables affecting the angler's lure choice.

There is a need for a product that simplifies the process by which data is received by anglers, while minimizing the problem of variables involved in each unique angling situation.

BRIEF SUMMARY OF THE INVENTION

The present invention is an electronic fishing aid that includes a user interface having user inputs and a display, a data structure containing data, containing variables relating to fishing lures, and a processor for controlling the display based upon the user inputs and data from the data structure. The data structure includes data associating lures, depths, and line lengths (and optionally other parameters such as line type, speed and added weight). A user is led through the user interface to provide inputs, so that information necessary for the angler to cast or troll a particular lure to a particular depth is provided.

DETAILED DESCRIPTION

Figure 1:
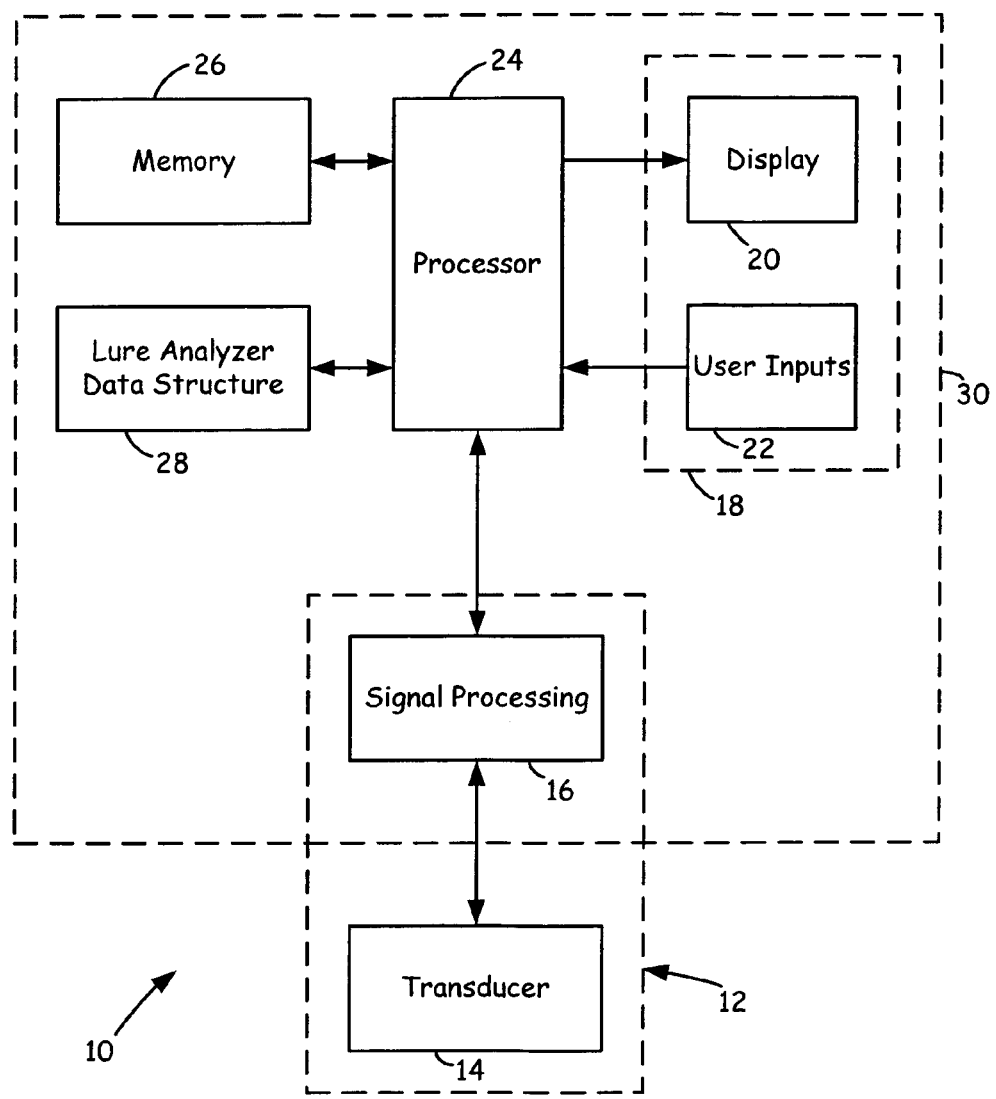
FIG. 1 is a block diagram of an embodiment of the electronic fishing aid of the present invention.

FIG. 1 is a block diagram of marine electronics 10, which incorporates the lure depth analyzer of the present invention. Marine electronics 10 includes sensor 12, (formed by transducer 14 and signal processing circuitry 16), user interface 18, (formed by display 20 and user inputs 22), processor 24, memory 26, and lure analyzer data structure 28. In the embodiment shown in FIG. 1, all elements of marine electronics 10 except for transducer 14 may be located in a common housing 30.

Sensor 12 is, for example, a sonar depth finder or fish finder, a GPS system, or radar system. In the case of a depth finder or fish finder, transducer 14 is a sonar transducer. In the case of a GPS system, transducer 14 is a GPS receiver. In the case of a radar system, transducer 14 is a radar antenna.

Signal processing circuitry 16 receives sensor signals from transducer 14 and converts those sensor signals into data for display on display 20. The data from signal processing circuitry 16 may be routed directly to display 20, may be stored in memory 26 for subsequent display, or may be analyzed by processor 24 and used in conjunction with other information in memory 26 or data structure 28 to provide information displayed on display 20.

Although a single sensor 12 is shown in FIG. 1, marine electronics can include multiple sensors so that, for example, both depth finder and GPS information are available to be displayed selectively or simultaneously on display 20.

Display 20 is typically a flat panel such as a liquid crystal display. User inputs 22 are, for example, individual push button switches or keys located around the periphery of display 20. User inputs 22 may be specifically labeled for a particular function, or may be "soft keys" which have different functions depending upon what is being displayed on display 20 at that time. User inputs 22 may also include a numerical keypad.

Processor 24 is a digital processor, such as a microprocessor with associated interface circuitry. It may include internal memory in addition to memory 26 and data structure 28.

Memory 26 includes both ROM and RAM data storage for data and programming required by processor 24 to operate in the various operating modes of marine electronics 10.

Lure analyzer data structure 28 provides the data necessary for marine electronics 10 to provide the lure analyzer function of the present invention. The data includes, for example, look-up tables or equations together with parameters and coefficients. Data structure 28 maybe in the form of a removable memory device such as a data card, memory stick, or the like. Alternatively, data structure 28 may be stored within memory 26. In that case, marine electronics 10 preferably includes a data port for connection to another device, such as a laptop computer or a PDA, through which data contained in data structure 28 can be loaded into memory 26 and modified. Alternatively, user inputs 22 and processor 24 can provide an ability for a user to modify data contained within data structure 28.

In operation, marine electronics 10 has a normal operating mode in which it provides functions based upon inputs from sensor 12. In other words, marine electronics 10 will normally function as a sonar depth finder, fish finder, GPS system or radar display system. The angler uses the fishing or navigational information being displayed to locate the desired fishing area, or to search for and hopefully locate fish. Those fish may be at different depths within the water column, depending upon a number of factors such as time of year, weather, type of bait or forage available, and location or movement of bait. The angler may, for example, see fish on a fish finder at a particular depth and decide to present a lure at or somewhat above the depth shown. The angler may have a particular lure in mind, or may need to determine which of the lures available to the angler are capable of reaching the desired depth.

There are a number of variables that affect the depth at which a lure is presented. These include the particular lure model (which includes its physical shape, size, and weight), line length or distance, fishing line type (which affects line diameter), speed at which the lure will move through the water during either trolling or retrieving, and whether additional weight is being added to the line (such as by a snap weight or in-line weight). These variables are stored within lure analyzer data structure 28. The variables are associated with one another, either in the form of look-up tables, or by algorithms to be used in conjunction with those variables to identify those combinations of variables which satisfy the requirement specified. In other words, some of the variables will be specified (either by the angler, by sensor data, or by default), and others are determined by processor 24 based upon data in data structure 28, and then displayed on display 20.

The present invention provides a number of different modes by which the angler can obtain enough information to select a lure and present it at the desired depth. These modes include a depth input mode, a lure model input mode, a line length input mode, a speed input mode, and a weight input mode.

In the depth input mode, the angler provides an input through user inputs 22 selecting the lure analyzer function. The first input of the depth input mode is an input indicating depth. This is provided by the angler through user inputs 22. In one embodiment, a number key pad is provided as part of user inputs 22, and a numerical depth is entered. Alternatively, up/down keys can be provided for a slew entry numerical input. Still another method of depth input is with a scrolling depth bar or cursor which appears on display 20. The scroll bar may move through a numerical list until the desired depth is reached, or the scroll bar or cursor may be incorporated as part of a sonar depth screen being displayed on display 20 based upon sonar signals from sensor 12. In that case, the angler uses a key to move a depth indicating bar down the screen and display a depth value as it moves. The bar can be scrolled either to a depth desired by the user or to the level of a fish displayed on display 20 based upon data from sensor 12. Once the scroll bar is in position, the angler starts further analysis by entering that particular depth.

Once depth has been entered, processor 24 will respond in one of several ways, which may be automatically programmed, or which may be selectable by the angler.

In a first alternative, processor 24 may cause display 20 to display a list of lures with the line length necessary for each of those lures to achieve the requested depth. Some lures may not be capable of diving to the requested depth, and may be omitted or indicated as not meeting the depth requirement. If this is sufficient information for the angler, the lure analyzer function can be exited at that point. Alternatively, angler can input further variables to request more detailed information from data structure 28. These further variables include line type, speed, and additional weight systems. The further variables are entered by the angler, and processor 24 accesses data structure 28 and provides further refined data on display 20.

In a second alternative, a list of angler-selected lures appears. These angler-selected lures may be previously selected through a menu displayed by display 20. For example, the angler maybe allowed to choose those specific lures that the angler has available (a subset of the whole data structure) to be displayed any time the angler requests data for lure depth. This list of lures may display a line length along with the lures, or may prompt the user to input one specific lure in order to view running depth. Similarly, the user maybe prompted to input additional variables such as line type, speed, and additional weight to allow processor 24 to further refine the data returned through display 20.

In a third alternative, a list of lures appears, together with a prompt requiring the angler to either select a particular lure or provide additional variables such as speed, line type, or weight information. Processor 24, through display 20, may then either narrow the list of available lures to those that are capable of reaching the desired depth based upon the variables entered, or may request identification of a particular lure be selected so that it can then display line length information.

A fourth alternative provides a list of qualified lures in response to a depth input. The qualified lures are only those capable of diving to the requested depth. The user may then be prompted to input additional variables or to select a particular lure in order to further refine the information, and ultimately provide the line length information.

The lure model input mode is initiated by the angler either inputting an identification of the lure model, or selecting the lure from a menu structure. Once the lure is chosen, processor 24 retrieves associated information from data structure 28 and displays all or part of the data available for that lure. Alternatively, processor 24 can prompt the angler by requesting additional variables (speed, line type, line length, depth) be entered. Once the additional data is entered, processor 24 displays data based upon the lure model selected and the additional variables provided.

In the line length input mode, the user enters a line length as the initial information. Once line length is entered, processor 24 responds by either first requesting an additional input (e.g. speed), or by displaying lure information in one of several possible formats.

First, processor 24 can respond to the line length input by displaying a listing of all lures, together with the running depths at that input line length. Second, processor 24 can display lures together with a request for an additional variable input (such as speed, line diameter, line type). This may be accompanied by a request that the angler make a specific lure choice. Third, processor 24 can display the most recently chosen lures with depths associated or a request for additional variables or a specific lure choice. This format requires a processor 24 store previous lure selections in memory 26, so that it can display those lures that have most recently been chosen through operation of the lure analyzer feature.

The speed input mode is initiated by a speed input. The speed input can be entered numerically by the user when initiating the lure analyzer function, or can be automatically entered as a user preference in memory 26 and then retrieved as a default value. Alternatively, the speed input can be derived from an external data source. For example, sensor 12 can be a GPS system which provides speed over ground data, or can be a paddle wheel speed sensor. In this case, speed data is already available to processor 24 when the user initiates the lure analyzer feature or selects one of the other input modes.

The weight input mode is similar to the lure input mode. An example of use of this input mode is when the angler will be trolling spinners with an in-line or snap weight. The weight input can be an initial step then leading to one of the other input modes already discussed. Because running depths of weights are greatly affected by speed, a speed input either based upon sensed speed or angler input is typically the next step following a weight input.

With each of these operating modes, the angler is quickly led through interface 18 to provide those selections or known variables available to the angler in order to obtain the remaining information to provide the desired presentation at the desired depth in the water column. Marine electronics 10 with the lure analyzer feature is readily accessible to the angler, and preferably provides other fishing and navigational information features. Marine electronics 10 can be mounted on a console or other locations in the boat where it is readily at hand when the angler needs to make decisions relating to lures to be used, speeds needed for presentation, and line lengths necessary for either trolling or casting.

The invention can also continue to provide information to the angler after lure selection has been made. For example, after the angler has inputted variables and has provided an input indicating a final selection, processor 24 can cause display 20 to provide a marker on a sonar image indicating the running depth of the selected lure. A numerical value representing running depth can also be displayed. The marker's location can remain fixed, or can change with a speed input, such as from a GPS system or paddle wheel sensor. Similarly, if the angler provides an input changing variables (e.g. to indicate a change in line length), processor 24 recalculates running depth and adjusts the marker location or any numerical display of running depth.

The present invention is a benefit to anglers because it addresses issues currently found in the process of determining variables associated with lure running depths. Current systems, which rely upon books or charts, are cumbersome to interpret, require additional work to employ, are not part of the act of angling, and often contain incomplete data or require calculations and extrapolations by the angler that are inconvenient and inefficient.

The present invention provides the angler with a tool and method in which very little interpretation needs to be done by the angler to provide the answers to questions posed by the angler. Instead, the analysis and interpretation is done automatically by processor 24 based upon data structure 28.

In contrast, consider the steps that an angler currently has to perform using a book as a source of information. In this example, assume the angler needs to determine the running depth of a Storm Deep Thunderstick crank bait with 120 feet of Berkley Fireline trolled at a speed of 2.8 miles per hour with a one ounce sinker placed on the line 50 feet in front of the lure. The angler must perform the following series of actions:

First, the angler must get the book of lure dive curve algorithms from a waterproof compartment of the boat. If the book is not stored in a waterproof location, it will become unusable due to moisture over a relatively short period of time.

Second, once the book is located, the angler needs to flip through the book until the desired lure is found. The more comprehensive the book is in terms of lure information, the longer it takes to locate one particular lure in that book.

Third, the angler looks at the line distance (horizontal) axis of the algorithm graph on the page relating to the selected lure. The angler needs to find the 120 foot mark, since that is the line length of interest.

Fourth, the angler must look upward from the 120 foot mark on the line length axis to the dive curve algorithm, and then follow from the intersection point across to the depth (vertical) axis in order to find a running depth.

Fifth, once running depth is determined, the angler must turn to another page of the book to find the conversion for finding the Berkley Fireline. This is because the printed algorithm assumes Berkley Trilene XT line type. Even with the same pounds test, the different line types will provide different running depths because the material and the line diameters are substantially different.

Sixth, after finding the converted depth on Berkley Fireline, the angler must again turn to another page. In this case, it is the page where another conversion must be made for trolling speed. This is necessary because the dive curve algorithms appearing on individual pages of the book assume a 2.0 mph trolling speed. In the example, the angler is interested in trolling at a speed of 2.8 mph.

Seventh, once the speed conversion is completed, the angler must turn to yet another page to find the conversion formula for a one ounce weight. The angler has to make a calculation involving a multiplication to the speed adjusted depth number in order to adjust to the weight on the line.

Once all of these steps are complete, the angler will know the running depth of the lure being used. Several conversions have been necessary, along with significant effort on the part of the angler going from chart-to-chart in order to obtain an accurate result. This example involved the angler knowing all the variables except for running depth. If more than one variable is unknown or could be adjusted, the task becomes even more difficult, more error prone, and more time consuming.

The present invention automates the process of obtaining information needed to make a lure presentation at a desired depth. It provides an intuitive and guided path by which the angler can input what information is available, and then view and select from alternatives in order to arrive at workable alternatives and finally a selection which is consistent with the angler's preferences and the equipment available. This process is handled in a tool that is already familiar to anglers and can be incorporated into a tool which is already in use by the angler. It avoids having to add an additional piece of equipment.

Most anglers who utilize data on lure running depth in books and charts already have marine electronics on their boats. They are already familiar with computerized navigational and fishing aids. The present invention provides additional functionality which has not been available to anglers. It results in better and more informed choices of lures and presentation techniques, with far less angler effort and mathematics skills than has been required in the past.

Although the present invention has been described with reference to preferred embodiments, workers skilled in the art will recognize the changes may be made in form and detail without departing from the spirit and scope of the invention.

The invention claimed is:

1. An electronic fishing aid comprising:
   a user interface having user inputs and a display;
   a data structure containing data relating to variables including lures,
      depths and line lengths;
   a processor for controlling the display, to provide information to a user
      identifying a lure, depth and line length combination as a function
      of user inputs and data from the data structure.

2. The electronic fishing aid of claim 1, wherein the data relating to variables further includes line type data.

3. The electronic fishing aid of claim 1, wherein the data relating to variables further includes speed data.

4. The electronic fishing aid of claim 1, wherein the data relating to variables further includes additional weight data.

5. The electronic fishing aid of claim 1, wherein in a depth input mode, the processor causes the display to identify lures and associated line lengths in response to a user input specifying a depth.

6. The electronic fishing aid of claim 5, wherein in the depth input mode, the processor causes the display to list angler-selected lures that have previously been selected by an angler.

7. The electronic fishing aid of claim 5, wherein in the depth input mode the processor causes the display to list only qualified lures capable of diving to the depth specified, based upon data in the data structure.

8. The electronic fishing aid of claim 1 and further comprising:
   a sonar system for providing to the display data representing an
      underwater sonar image; and
   wherein the user inputs include a depth cursor displayable on the display
      in association with the underwater sonar image to provide a
      depth selection input to the processor.

9. The electronic fishing aid of claim 1, wherein in a lure model input mode, the processor causes the display to display depth and line length information associated with a lure selected by a user input.

10. The electronic fishing aid of claim 1, wherein in a line length input mode, the processor causes the display to display lure and depth information associated with a depth selected by a user input.

11. The electronic fishing aid of claim 1, wherein in a speed input mode, the processor causes the display to display the display lure, line length and depth information associated with a speed identified by a speed input.

12. The electronic fishing aid of claim 11, wherein the speed input is one of an angler input and a sensed speed input.

13. The electronic fishing aid of claim 1, wherein the processor causes the display to display an indication of running depth based on a lure selection.

14. The electronic fishing of claim 1, wherein in a weight input mode, the processor causes the display to display depth and line length information associated with an additional weight selected by a user input.

15. The electronic fishing aid of claim 1 and further comprising:
   a sensor providing fishing data for display on the display.

16. The electronic fishing aid of claim 1 and further comprising:
   a sensor providing navigational data for display on the display.

17. The electronic fishing aid of claim 1, wherein the data structure is contained in a removable memory device.

18. The electronic fishing aid of claim 1 and further comprising:
   a memory associated with the processor, and wherein the data structure
      is stored in the memory.

19. The electronic fishing aid of claim 1, and further comprising:
   a sonar system for providing, to the display, data representing an
      underwater sonar image; and
   wherein the processor causes the display to display a marker in
      conjunction with the sonar image indicating a running depth of a
      selected lure.

20. The electronic fishing aid of claim 19, wherein the processor determines marker location as a function of a speed input.

* * * * *

UNITED STATES PATENT AND TRADEMARK OFFICE
CERTIFICATE OF CORRECTION

PATENT NO. : 7,113,449 B2 Page 1 of 1
APPLICATION NO. : 11/017034
DATED : September 26, 2006
INVENTOR(S) : Scott R. Fairbairn It is certified that error appears in the above-identified patent and that said Letters Patent is hereby corrected as shown below:

Column 1, Line 18, delete "angle", insert --Anglers--

Column 1, Line 28, delete "arid", insert --and--

Column 1, Line 41, delete "S. Dak.,", insert --South Dakota--

Column 2, Line 15, delete "precision", insert --Precision--

Column 3, Line 48, delete "maybe", insert --may be--

Column 4, Line 65, delete "maybe", insert --may be--

Column 5, Line 4, delete "maybe", insert --may be--

Column 5, Line 54, delete "paddle wheel", insert --paddlewheel--

Column 6, Line 18, delete "paddle wheel", insert --paddlewheel--

Signed and Sealed this

Ninth Day of January, 2007

JON W. DUDAS
*Director of the United States Patent and Trademark Office*